United States Patent [19]

Speranza et al.

[11] Patent Number: 5,138,097
[45] Date of Patent: Aug. 11, 1992

[54] AMINE TERMINATED POLYAMIDES

[75] Inventors: George P. Speranza; Wei-Yang Su, both of Austin, Tex.

[73] Assignee: Texaco Chemical Company, White Plains, N.Y.

[21] Appl. No.: 658,813

[22] Filed: Feb. 22, 1991

Related U.S. Application Data

[62] Division of Ser. No. 448,417, Dec. 11, 1989, Pat. No. 5,091,572.

[51] Int. Cl.$^5$ .................. C07C 237/08; C07C 237/32
[52] U.S. Cl. ................................................. 564/153
[58] Field of Search ....................... 564/153; 528/340

[56] References Cited

U.S. PATENT DOCUMENTS

| | | | |
|---|---|---|---|
| 2,149,273 | 3/1939 | Carothers | 528/342 |
| 2,359,867 | 10/1944 | Martin | 528/340 |
| 3,556,927 | 1/1971 | Sommer et al. | 428/374 |
| 3,654,370 | 4/1972 | Yeakey | 564/480 |
| 3,738,945 | 6/1973 | Panzer et al. | 528/405 |
| 4,082,708 | 4/1978 | Mehta | 528/111.3 |
| 4,100,116 | 7/1978 | Mazanek et al. | 564/153 |
| 4,128,525 | 12/1978 | Yeakey et al. | 524/602 |
| 4,133,803 | 1/1979 | Klein | 528/340 |
| 4,182,845 | 1/1980 | Yeakey et al. | 528/340 |
| 4,229,567 | 10/1980 | Sharkey | 528/338 |
| 4,304,889 | 12/1981 | Waddill et al. | 525/514 |
| 4,708,973 | 11/1987 | Dohr et al. | 523/102 |
| 4,740,582 | 4/1988 | Coquard et al. | 528/339.1 |
| 4,751,255 | 6/1988 | Bently et al. | 521/163 |
| 4,760,125 | 7/1988 | Wiemers et al. | 528/339.3 |
| 4,789,721 | 12/1988 | Waddill et al. | 528/111 |
| 4,855,377 | 8/1989 | Yokota et al. | 528/370 |
| 4,946,933 | 8/1990 | Speranza et al. | 528/339.3 |

Primary Examiner—Glennon H. Hollrah
Assistant Examiner—Scott C. Rand
Attorney, Agent, or Firm—Jack H. Park; Kenneth R. Priem; Carl G. Ries

[57] ABSTRACT

Liquid amine terminated polyamide addition products having an average molecular weight of about 3,000 to about 10,000 are prepared by the non-catalytic reaction of a dicarboxylic acid having a molecular weight within the range of about 130 to about 700 with a higher molecular weight polyoxypropylene diamine having an average molecular weight within the range of about 1,500 to about 6,000 and with a lower molecular weight polyoxypropylene diamine having an average molecular weight within the range of about 200 to about 700, the reaction conditions including a temperature within the range of about 150° to about 280° C., a pressure of about 0.1 to 20 atmospheres and a reaction time of about 2 to about 5 hours.

7 Claims, No Drawings

AMINE TERMINATED POLYAMIDES

This is a division of application Ser. No. 07/448,417, filed Dec. 11, 1989, now U.S. Pat. No. 5,091,572.

BACKGROUND OF THE INVENTION

1. Technical Field of the Invention

This invention relates to amine terminated polyamides. More particularly, this invention relates to amine terminated polyamides having an average molecular weight of about 3,000 to about 10,000 which are useful in the preparation of adhesives, elastomers, polyamide-polyurea foams, polyepoxides, polyimides, etc.

Still more particularly, this invention is related to the preparation of normally liquid amine terminated polyamides having a molecular weight within the range of about 3,000 to about 10,000 and to a method for the preparation of such amine terminated polyamides by the reaction of an aromatic or an aliphatic dicarboxylic acid with a first higher molecular weight polyoxypropylene diamine and with a second lower molecular weight polyoxypropylene diamine.

2. Prior Art

It is known, as exemplified by Yeakey U.S. Pat. No. 3,654,370 to prepare polyoxyalkylene polyamines by the reductive amination of a polyoxyalkylene polyol. The reductive amination is conducted catalytically in the presence of hydrogen and ammonia and an appropriate reductive amination catalyst, such as a nickel, copper and chromia catalyst. The polyoxyalkylene polyamines that are prepared in this fashion are stable articles of commerce having a wide variety of uses such as those mentioned above. In particular, they have found utility as curing agents for epoxy resins, as plasticizers, as cross linking agents and binders for textiles, and as intermediates in the preparation of polyureas. In general, polyoxyalkylene polyamines having molecular weights ranging from about 200 to about 5,000 can be prepared by the Yeakey process.

Klein U.S. Pat. No. 4,133,803 discloses thermoplastic adhesives having a melting point between 20° C. and 180° C. prepared from polyoxypropylene diamines and triamines and mixtures thereof having molecular weights of about 190 to about 3,000 and aliphatic or aromatic dicarboxylic acids, esters and anhydrides thereof containing about 2 to 30 carbon atoms per molecule. The polyoxypropylene amine component and the dicarboxylic acid component are reacted in the mole ratio of about 0.25:1 to about 4.0:1. The thermoplastic adhesives of Klein are useful in the preparation of "hot melt" adhesives. In Example I, a thermoplastic adhesive prepared by reacting a molar excess of a polyoxypropylene diamine having an average molecular weight of about 230 with isophthatic resin at a temperature of 200°-240° C. was formulated at 140° C. with an epoxy resin, a plasticizer and silica to provide adhesives that were applied to substrates with good results.

Yeakey et al. U.S. Pat. Nos. 4,128,525 and 4,182,845 are directed to thermoplastic adhesives of the type disclosed in Klein U.S. Pat. No. 4,133,803 modified by the inclusion of piperazine together with the polyoxypropylene diamine or triame as a reactant, the piperazine constituting at least 80 mole percent of the amine component.

In Kuceski U.S. Pat. No. 4,182,844 an energy-conserving method is disclosed for use in the manufacture of polyaminoamides of the type prepared by reacting a polycarboxylate ester with a mono- or polyalkylene polyamine wherein the reactants are externally heated only to a temperature (e.g. 125° C.) at which the exothermic reaction becomes self-sustaining, after which external heating is discontinued. The desired temperature range is thereafter maintained because the heat of reaction is used to vaporize by-product water and alcohol from the reaction mixture.

Impact resistant thermoplastic polyamides useful in the preparation of holt melt adhesive formulations by interreacting 57.5-94.75 mole percent of a short chain polyamide forming moiety such as a dicarboxylic acid or a diamine with 5-30 mole percent of a polyamide-forming dimer acid moiety and 0.25-12.5 mole percent of a polyamide-forming moiety such as an amine or carboxy terminated butadiene-acrylonitrile copolymers or poly(oxyalkylene) diamines.

Bentley et al. U.S. Pat. No. 4,751,255 relates to polymeric polyamines having molecular weights ranging from 1,000 to 16,000 and containing from 2 to 4 primary amino groups per molecule which are prepared by reacting a polycarboxylic acid or ester with a stoichiometric excess of a polyamine having terminal aminopropoxy groups and a molecular weight of less than 500. In an example, a molecular excess of a polyoxypropylene diamine having an average molecular weight of about 400 was reacted with dimethyl terephthalate to provide a product having a viscosity of 931 centistokes at 100° C.

3. Background of the Invention

The polyoxyalkylene polyamines of the type disclosed in Yeakey U.S. Pat. No. 3,654,370 are prepared from polyols prepared by the oxyalkylation of a polyhydric alcohol. The preferred starting materials are dihydric and trihydric alcohols such as propylene glycol or glycerol and propylene oxide or ethylene oxide. Copolymer polyols of ethylene oxide and propylene oxide are also useful, particularly those containing from about 5 to about 40 wt. % of ethylene oxide and, correspondingly, from about 95 to about 60 wt. % of propylene oxide.

The molecular weight of the polyol is determined by the number of moles of epoxide that are reacted with the alcohol initiator. Since the addition is random, the final alkoxylation product will not be a pure compound but, rather, will be a mixture of polyoxyalkylene polyols For example, if the polyol is a polyol prepared by reacting glycerol or trimethylol propane with propylene oxide, using an amount of propylene oxide adequate to provide for an average molecular weight of about 1,000, the final propoxylation product will actually be composed of a mixture of polyoxypropylene triols having molecular weights varying from about 800 to about 1,200, the molecular weight distribution following a Gaussian distribution curve (sometimes referred to as a sine curve or a Poissan curve). As the molecular weight of the polyol increases, the spread in the molecular weights will also increase. Thus, when the average molecular weight of the triol is about 3,000, the deviation will be about ±400 molecular weight units so that most of the product will fall within the molecular weight range of about 2,600 to about 3,400.

As the molecular weight is still further increased, the percentage of free hydroxyl groups in the reaction mixture will decrease because of the added bulk of the already formed polyol, thus making the addition of more propylene oxide groups progressively more difficult. As a practical matter, when the triol reaches an average molecular weight of about 5,000, further propoxylation is accomplished only with extreme difficulty. The 5,000 molecular weight polyoxypropylene triols will have a molecular weight distribution of about ±000 so that the actual molecular weight range will be from about 4,000 to about 6,000. Again, the molecular weight distribution following a Gaussian distribution curve.

A further complication is encountered during the propoxylation to the higher molecular weights. As the reaction time and temperature are increased to encourage propoxylation, there is introduced a tendency on the part of the propylene oxide to isomerize to allyl alcohol and a tendency on the part of the hydroxypropyl end groups of the polyoxypropylene triol to dehydrate to form a terminal olefin group and water. Both the water and the allyl alcohol are susceptible to oxyalkylation thereby diluting the polyoxypropylene diol with undesired generally low molecular weight diol contaminants derived from the water and monofunctional allyl alcohol propoxylates. From as little as one percent to as much as ten percent of the oxypropyl end groups of the triol may dehydrate to form groups with terminal unsaturation in increasing the average molecular weight from about 3,000 to about 5,000.

When a polyoxypropylene polyol of this nature is reductively aminated in accordance with the procedure of Yeakey U.S. Pat. No. 3,654,370, comparatively higher temperatures and longer reaction times are required as the molecular weight of the polyol increases This can result in the cleavage of the polyol to form undesired and unwanted alkyl ether by-products and hydrogenation of the unsaturated groups on the polyol to form propyl ethers.

Thus, although the results obtained heretofore with polyoxyalkylene diamines and triamines of the type disclosed by Yeakey have been generally satisfactory, problems such as those mentioned above have detracted from the utility of the products.

It is known to use polyamides as hot melt adhesives. They are used as hot melt adhesives because the polyamides are normally high melting solids or resinous materials which are not liquids at ambient temperatures. It is believed that these characteristics are brought about because of the hydrogen bonding that occurs throughout the amide linkages.

Polyamides prepared by reacting a molar excess of a low molecular weight polyoxypropylene diamine having a molecular weight of about 150 to about 700 with an aliphatic dicarboxylic acid such as adipic acid are not pourable at room temperature and are very viscous even at 60° C. In addition, these products are not compatible with high molecular weight polyether polyols or polyether amines and are therefore of only marginal utility in the preparation of polyurethanes.

SUMMARY OF THE INVENTION

It has been discovered in accordance with the present invention that amine terminated polyamides prepared by reacting an appropriate aliphatic or aromatic dicarboxylic acid with a molar excess of both a higher molecular weight polyoxypropylene diamine having an average molecular weight within the range of about 1,500 to about 6,000 and with a lower molecular weight polyoxypropylene diamine having an average molecular weight within the range of about 200 to about 700 under the appropriate reaction conditions will result in the formation of an addition product of an amine terminated polyamide, which is normally pourable at room temperature and also at elevated working temperatures and which is compatible with a wide variety of polyether poyols and polyoxypropylene diamines.

In accordance with the present invention, a liquid amidoamine addition product having an average molecular weight of about 3,000 to about 10,000 is prepared by the noncatalytic reaction of a dicarboxylic acid having a molecular weight within the range of about 130 to about 700 with a first higher molecular weight polyoxypropylene diamine having an average molecular weight within the range of about 1,500 to about 6,000 and with a second lower molecular weight polyoxypropylene diamine having an average molecular weight within the range of about 200 to about 700, the method comprising the steps of:

a. Reacting the dicarboxylic acid with the first and second polyoxypropylene diamines under reaction conditions including a temperature within the range of about 150° to about 280° C., a pressure of about 0.1 to about 20 atmospheres and a reaction time of about 2 to about 5 hours to provide a reaction product, b. Recovering a liquid amine terminated polyamide addition product from the reaction mixture, c. The first and second polyoxypropylene diamines being reacted with the dicarboxylic acid in the molar ratio of about 1.05 to about 1.5 moles of total polyoxypropylene diamine per mole of dicarboxylic acid, the first and second polyoxypropylene diamines being used in the ratio of about 0.25 to about 3 moles of said first higher molecular weight polyoxypropylene diamine per mole of said second lower molecular weight polyoxypropylene diamine, d. The dicarboxylic acid being selected from the group consisting of aliphatic dicarboxylic acids containing 6 to 36 carbon atoms, aromatic dicarboxylic acids containing 8 to 16 carbon atoms, anhydrides and $C_1$–$C_4$ alkyl esters thereof, e. The dicarboxylic acid and the first and second polyoxypropylene diamines being reacted within the proportions and in amounts to provide an addition product having an average molecular weight of about 3,000 to about 10,000, f. The first and second polyoxypropylene diamines having the formula:

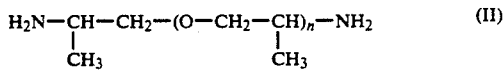

(II)

wherein n for the first higher molecular weight polyoxyproylene diamine represents a positive number having an average value of about 25 to about 100 and wherein n for the second lower molecular weight polyoxypropylene diamine represents a positive number having an average value of about 3 to about 11.

The first and second polyoxypropylene diamines may be simultaneously reacted with the dicarboxylic acid component, and when this is done a suitable reaction product will be obtained.

In accordance with the preferred embodiment of the present invention, the higher molecular weight polyoxypropylene diamine is initially reacted with the dicarboxylic acid to provide an intermediate reaction product which is then reacted with the lower molecular weight polyoxypropylene diamine to provide a final reaction product. When this is done, the reaction product will be a reaction product having the formula:

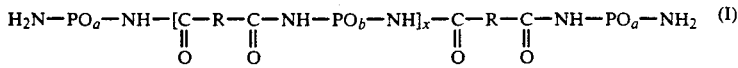

wherein:

PO represents a polyoxypropylene group,

R is a divalent hydrocarbon group consisting of about 4 to about 34 carbon atoms, resulting from the reaction of an aliphatic or an aromatic dicarboxylic acid with a polyoxypropylene diamine, a is a positive number having a value of 3 to about 11, b is a positive number having a value of about 25 to about 100, and x is a positive number having a value of about 1 to about 5.

DETAILED DESCRIPTION

The Dicarboxylic Acid Starting Material

The dicarboxylic acid starting material for the present invention may be any suitable aliphatic or aromatic dicarboxylic acid containing from about 3 to about 70 carbon atoms, having an average molecular weight of about 130 to about 700 or an anhydride or a lower alkyl ester thereof wherein the alkyl group contains from about 1 to 4 carbon atoms and, more preferably, is methyl.

Examples of suitable aliphatic dicarboxylic acids that may be used include adipic acid, dodecanedioic acid, glutaric acid, azelaic acid, sebacic acid, the so-called "dimer acid" prepared by the dimerization of unsaturated monocarboxylic acids such as oleic acid, linoleic acid, eleostearic acid, and mixtures which are sold commercially as "tall oil fatty acids".

Other suitable dicarboxylic acids that may be used include brasslic acid, octadecanedioic acid and thapsic acid.

Examples of aromatic dicarboxylic acid that may be used as starting materials for the present invention include acids such as terephthalic acid, isophthalic acid, 1,1,3-trimethyl-3-phenylidan-4',5-dicarboxylic acid, 2,6-naphthalene dicarboxylic acid, t-butyl isophthalic acid, etc. (i.e., benzene dicarboxylic acids and 2-phenyl pentanedioic acid, etc.).

The Lower Molecular Weight Polyoxypropylene Diamine

The lower molecular weight polyoxypropylene diamines to be used as starting materials in accordance with the present invention are polyoxypropylene diamines having an average molecular weight within the range of about 200 to about 700 and having the formula:

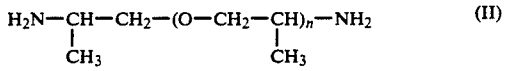

wherein n represents a positive number having an average value of about 3 to about 11.

Representative examples of suitable polyoxypropylene diamines that are commercially available include, for example, polyoxyproylene diamines sold by the Texaco Chemical Company including a product Jeffamine ®️ D-230 amine wherein x in the above formula has a value between 2 and 3 and a product Jeffamine ®️ D-400 amine wherein x has a value between about 5 and 6.

The Higher Molecular Weight Polyoxypropylene Diamine

The higher molecular weight polyoxypropylene diamines to be used in accordance with the present invention as starting materials are polyoxypropylene diamines having an average molecular weight within the range of about 1,500 to about 6,000 and having the formula:

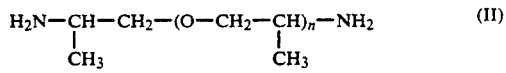

wherein n represents a positive number having an average value of about 25 to about 100.

Representative examples of commercially available materials include, for example, a product sold by the Texaco Chemical Company Jeffamine ®️ D-2000 amine wherein x has a value of about 33 and a product sold by the Texaco Chemical Company identified as Jeffamine ®️-4005 amine having an average molecular weight of about 4,000 wherein x has a value of about 60.

Preparation of the Amine Terminated Polyamides

In accordance with the present invention, a dicarboxylic acid of the type described above having a molecular weight within the range of about 130 to about 700 is reacted with a molar excess of polyoxypropylene diamines, the polyoxypropylene diamines comprising a first higher molecular weight polyoxypropylene diamine having an average molecular weight of about 1,500 to about 6,000 and the second lower molecular weight polyoxyproylene diamine having an average molecular weight within the range of about 200 to about 700.

Preferably, the first and second polyoxypropylene diamines are reacted with the dicarboxylic acid in the molar ratio of about 1.05 to about 1.5 moles of total polyoxypropylene diamine per mole of dicarboxylic acid, the first and second polyoxypropylene diamines being used in the ratio of about 0.25 to about 3 moles of the first higher molecular weight polyoxypropylene per mole of the second lower molecular weight polyoxypropylene diamine.

Thus, for example, and in accordance with the preferred embodiment of the present invention, about 2 moles of a first higher molecular weight polyoxypropylene diamine having an average molecular weight of about 2,000 and about 2 moles of a lower molecular weight polyoxypropylene diamine having an average molecular weight of about 430 are reacted with about 3 moles of an appropriate dicarboxylic acid such as adipic acid, dodecanedioic acid, isophthalic acid, $C_{36}$ dimer acids, etc.

As another example, about 1.5 moles of a polyoxypropylene diamine having an average molecular weight of about 2,000 and about 2.5 moles of a polyoxypropylene diamine having a lower molecular weight of about 400 may be reacted with about 3 moles of a suitable dicarboxylic acid.

The reaction is suitably conducted at a temperature within the range of about 150° to about 280° C. and, more preferably, within the range of about 120° to about 220° C. Normally, a total reaction time of about 2 to about 5 hours will be adequate, although longer reaction times may be used if desired. The reaction is preferably conducted at atmospheric pressure, but may be conducted at any appropriate subatmospheric or superatmospheric pressure such as a pressure within the range of about 0.1 to about 20 atmospheres.

By-product water of reaction is preferably removed from the reaction mixture as formed. The reaction is complete when essentially all of the carboxylate groups have reacted with primary amine groups of the polyoxypropylene diamines to provide amide linkages. Under the noncatalytic reaction conditions employed herein, the primary amine groups of the polyoxypropylene diamines are essentially unreactive with each other.

The dicarboxylic acid may be reacted simultaneously with both the higher molecular weight polyoxypropylene diamine and with the lower molecular weight polyoxypropylene diamine. However, in accordance with the preferred embodiment of the present invention, the dicarboxylic acid is first reacted with the higher molecular weight polyoxypropylene diamine to provide an intermediate reaction product which is then reacted with the lower molecular weight polyoxypropylene diamine.

When the dicarboxylic acid is reacted first with the higher molecular weight polyoxypropylene diamine and then with the lower molecular weight polyoxypropylene diamine an addition product is formed having the general formula:

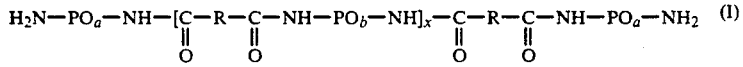

wherein:
PO represents a polyoxypropylene group,
R is a divalent hydrocarbon group consisting of about 4 to about 34 carbon atoms, resulting from the reaction of an aliphatic or an aromatic dicarboxylic acid with a polyoxypropylene diamine,
a is a positive number having a value of 3 to about 11,
b is a positive number having a value of about 25 to 100, and
x is a positive number having a value of 1 to about 5.

The amine terminated polyamides that are formed by the process of the present invention and having molecular weights within the range of about 3,000 to about 10,000 are normally liquid at ambient temperatures and are normally compatible at ambient temperatures with polyoxypropylene polyols and with polyoxypropylene polyamines.

The invention will be further illustrated by the following specific examples which are given by way of illustration and not as limitations on the scope of this invention.

Reaction Procedure

EXAMPLE 1 (6469-17)

General Procedure for the Preparation of Amine Terminated Polyamides

To a two-liter three-necked flask equipped with a thermometer, Dean-Stark trap, stirrer, and nitrogen bleed that went below the surface of the reactants was charged 500 g of Jeffamine ® D-2000 amine (0.25 mole), 109 g of adipic acid (0.75 mole), and 1.0 g of Ultranox ® 236 antioxidant. The mixture was heated to 200° C. for two hours. The reaction mixture was cooled to about 125° C. and 300 g of Jeffamine ® D-400 amine added (0.75 mole). The reaction mixture was then heated to 250° C. It was held at this temperature for one hour after no further water was generated. The resulting product was analyzed and the result given in Table I-A.

The Ultranox ® antioxidant used in conducting the experiments is a commercially available product which may generally be characterized as thio-bisphenol sold by General Electric.

EXAMPLES 2-12

In the manner described in Example 1, other amine terminated polyamides were prepared. The results are shown in Table I-A and Table I-B.

TABLE I-A

| | PROPERTIES OF AMINE TERMINATED POLYAMIDES | | | | | | | | | | | |
|---|---|---|---|---|---|---|---|---|---|---|---|---|
| Example | 1 | | 2 | | 3 | | 4 | | 5 | | 6 | |
| Part by mole | 6469-17 | | 6469-13 | | 6469-42 | | 6469-18 | | 6469-19 | | 6469-23 | |
| Jeffamine$^R$ D-2000 | 1 | | | | 2 | | 2 | | 1 | | 1 | |
| Jeffamine$^R$ D-400 | 3 | | 4 | | 2 | | 2 | | 7 | | 3 | |
| Jeffamine$^R$ D-230 | | | | | | | | | | | | |
| Adipic Acid | 3 | | 3 | | | | 3 | | 6 | | | |
| Dimer Acid | | | | | | | | | | | | |
| Dodecanedioic Acid | | | | | | | | | | | 3 | |
| Isophthalic Acid | | | | | 3 | | | | | | | |
| Total Acetylatables (meq/g) | 0.56 | | 0.69 | | 0.34 | | 0.37 | | 0.49 | | 0.37 | |
| Acid Value (mg KOH/g) | 0 | | 1.50 | | 3.79 | | 0 | | 1.55 | | 1.94 | |
| Amine Assay (meq/g) | 0.37 | | 0.50 | | 0.30 | | 0.28 | | 0.41 | | 0.36 | |
| Viscosity (cs at 60° C.) | 5,300 | | 22,500 | | 3,821 | | 4,300 | | 9,400 | | 6,900 | |
| Pourable at R.T. | Yes | | No | | Yes | | Yes | | Yes | | No | |
| Compatibility with | 80° C. | R.T. | 80° C. | R.T. | 80° C. | R.T. | 80° C. | R.T. | 80° C. | R.T. | 80° C. | R.T. |
| 20% SF-5505 | NC | NC | | | | | C | C | NC | NC | NC | NC |
| 80% SF-5505 | C | NC | NC | NC | C | C | C | C | NC | NC | | |
| 20% Jeffamine$^R$ D-2000 | NC | NC | | | | | C | C | NC | NC | NC | NC |
| 80% Jeffamine$^R$ D-2000 | C | C | NC | NC | C | C | C | C | NC | NC | | |
| 20% PPG-2000 | NC | NC | | | | | C | C | NC | NC | NC | C |

TABLE I-A-continued

PROPERTIES OF AMINE TERMINATED POLYAMIDES

| Example | 1 | | 2 | | 3 | | 4 | | 5 | | 6 | |
|---|---|---|---|---|---|---|---|---|---|---|---|---|
| Part by mole | 6469-17 | | 6469-13 | | 6469-42 | | 6469-18 | | 6469-19 | | 6469-23 | |
| 80% PPG-2000 | C | C | NC | NC | C | C | C | C | C | C | | |

TABLE I-B

PROPERTIES OF AMINE TERMINATED POLYAMIDES

| Example | 7 | | 8 | | 9 | | 10 | | 11 | | 12 | |
|---|---|---|---|---|---|---|---|---|---|---|---|---|
| Part by mole | 6469-24 | | 6469-25 | | 6469-26 | | 6469-27 | | 6469-28 | | 6469-34 | |
| Jeffamine® D-2000 | 2 | | 1 | | 2 | | 1 | | 1 | | 2 | |
| Jeffamine® D-400 | 2 | | 7 | | 2 | | 7 | | 3 | | | |
| Jeffamine® D-230 | | | | | | | | | | | 2 | |
| Adipic Acid | | | | | | | | | | | 3 | |
| Dimer Acid | 3 | | 6 | | | | | | 3 | | | |
| Dodecanedioic Acid | | | | | 3 | | 6 | | | | | |
| Isophthalic Acid | | | | | | | | | | | | |
| Total Acetylatables (meq/g) | 0.52 | | 0.43 | | 0.47 | | 0.46 | | 0.75 | | 0.29 | |
| Acid Value (mg KOH/g) | 1.13 | | 0.42 | | 2.48 | | 2.72 | | 0.57 | | 1.21 | |
| Amine Assay (meq/g) | 0.21 | | 0.29 | | 0.30 | | 0.42 | | 0.23 | | 0.23 | |
| Viscosity (cs at 60° C.) | 11,200 | | 21,200 | | 5,000 | | 9,800 | | 16,200 | | 5,100 | |
| Pourable at R.T. | Yes | | Yes | | No | | No | | Yes | | No | |
| Compatibility with | 80° C. | R.T. | 80° C. | R.T. | 80° C. | R.T. | 80° C. | R.T. | 80° C. | R.T. | 80° C. | R.T. |
| 20% SF-5505 | NC | NC | NC | NC | C | NC | NC | NC | NC | NC | C | NC |
| 80% SF-5505 | NC | NC | NC | NC | C | C | | | | | | |
| 20% Jeffamine® D-2000 | C | C | NC | NC | C | NC | NC | NC | NC | NC | C | NC |
| 80% Jeffamine® D-2000 | C | C | NC | NC | C | C | | | | | | |
| 20% PPG-2000 | | | NC | NC | C | NC | NC | NC | NC | NC | C | C |
| 80% PPG-2000 | C | C | NC | NC | C | C | | | | | | |

Turning now to Tables I-A and I-B, it will be noted that compatibility of the reaction product of the twelve examples was evaluated by seeing if they were compatible with three products, a product Thanol ® SF-5505 which may be characterized as 5500 molecular weight propylene oxide adduct of glycerine capped with ethylene oxide, a polyoxypropylene diamine identified above as Jeffamine ® D-2000 amine having an average molecular weight of about 2,000 and a polyoxypropylene glycol having an average molecular weight of about 2,000.

In making the evaluations, mixtures were prepared composed of 20 wt. % of the polyoxypropylene polyol or polyoxypropylene diamine and 80% of the amine terminated polyamide of the present invention, and by determining compatibility of a mixture of about 80 wt. % of the polyoxypropylene polyol or polyoxypropylene diamine with 20 wt. % of the amine terminated polyamide under investigation.

Note from Table I-A that the amine terminated polyamide of Example 1 (run 6469-17) was not compatible at room temperature with the Thanol ® SF-5505 and was only compatible with the Jeffamine ® D-2000 amine and the PPG-2000 in the 20 wt. % range. Heating the mixtures to 80° C. provided only marginal improvement because again, only the mixtures containing 20 wt. % of the amine terminated polyamide were compatible.

An amine terminated polyamide prepared by reacting four moles of a lower molecular weight polyoxypropylene diamine having an average molecular weight of 400 with three moles of adipic acid (Example 2, run 6469-13) resulted in the formation of a polyamide which was not compatible with the materials tested at either room temperature or at 80° C.

In contrast, in Example 3, wherein 2 moles of a higher molecular weight polyoxypropylene diamine (Jeffamine D-2000 amine) and the lower molecular weight polyoxypropylene diamine (Jeffamine ® D-400 amine) were reacted with 3 moles of isophthalic acid and the resultant amine terminated polyamide was compatible with all four of the materials at both room temperature and at 80° C. Good results were also obtained in Example 4 (6494-18) wherein 2 moles each of Jeffamine ® D-2000 amine and Jeffamine ® D-400 amine were reacted with 3 moles of adipic acid. However, when the molar proportions were changed so that only 1 mole of Jeffamine ® D-2000 amine and 7 moles of Jeffamine ® D-400 amine were reacted with 6 moles of adipic acid (Example 5) the results show greater compatability limitations.

Note also that the satisfactory amine terminated polyamides were pourable at room temperature.

The amine terminated polyamides of the present invention may be used, as indicated, for a variety of purposes such as, for example, for the preparation of epoxide resins and polyurethanes. This is illustrated by the following examples:

EXAMPLE 13 (6477-77A)—USAGE EXAMPLE

The sample of Example 5 (6469-19, 80 g) and Epon 828 (Shell product, 12.0 g) were mixed well, poured into a mold, and cured at 100° C. for six hours. A soft pliable soap dish was obtained. Epon 828 may be characterized as being a diglycidol ether of bis-phenol-A.

EXAMPLE 14 (6477-77B)—USAGE EXAMPLE

The sample of Example 1 (6469-17, 90 g) and Epon 828 (12.0 g) were mixed well, poured into a mold, and cured at 100° C. for six hours. A soft pliable soap dish was obtained.

EXAMPLE 15 (6477-81s)—USAGE EXAMPLE

To a small paper cup was added 40.0 g of the sample of Example 4 (6469-18), 0.4 g of L-711 silicone surfactant, 2.0 g of water, 0.2 g of Texacat ® ZF-22, and 32.8 g of Rubinate ® M. After stirring with a tongue depressor the mixture was poured into a bigger paper cup to produce a nice foam with rise time about 67 seconds.

The product Rubinate is a polyphenyl methylene polyisocyanate and the product Texacat® ZF-22 is a proprietary tertiary amine catalyst manufactured and sold by Texaco Chemical Company. L-711 silicone surfactant is available from Carbide.

EXAMPLE 16 (6477-81V)—USAGE EXAMPLE

To a small paper cup was added 40.0 g of the sample of Example 1 (6469-17), 0.8 g of L-711 silicone surfactant, 2.0 g of water, 0.3 g of N,N'-dimethylpiperazine, and 32.8 g of Rubinate® M. After stirring with a tongue depressor the mixture was poured into a bigger paper cup to produce a nice foam with rise time about 131 seconds.

EXAMPLE 17 (6477-81U)—USAGE EXAMPLE

To a small paper cup was added 40.0 g of the sample of Example 11 (6469-28), 0.6 g of L-711 silicone surfactant, 2.0 g of water, 0.3 g of N,N'-dimethylpiperazine, and 34.8 g of Rubinate® M. After stirring with a tongue depressor the mixture was poured into a bigger paper cup to produce a nice foam with rise time about 185 seconds.

EXAMPLE 18 (6469-38)

Preparation of Amine Terminated Polyamide in One Step

To a one-liter three-necked flask equipped with a thermometer, Dean-Stark trap, stirrer, and nitrogen bleed that went below the surface of the reactants was charged 500 g of Jeffamine® D-2000 amine, 54.8 g of adipic acid, 0.5 g of Ultranox® 236 antioxidant, and 100 g of Jeffamine® D-400 amine. The reaction mixture was heated to 180° C. for two hours and then 250° C. for another two hours. The product was analyzed:

| Total acetylatables | 0.47 meq/g |
| Acid value | 2.98 mg KOH/g |
| Amine Assay | 0.27 meq/g |
| Viscosity | 2,100 centistokes at 60° C. |

Having thus described our invention, what is claimed is:

1. A liquid polyamide having a molecular weight of about 3,000 to about 10,000 and having enhanced compatibility with polyoxypropylene polyols and polyoxypropylene polyamines having the formula:

$$H_2N-PO_a-NH-[C-R-C-NH-PO_b-$$
$$\phantom{H_2N-PO_a-NH-[}\|\phantom{-R-}\|$$
$$\phantom{H_2N-PO_a-NH-[}O\phantom{-R-}O$$

$$-NH]_x-C-R-C-NH-PO_a-NH_2$$
$$\phantom{-NH]_x-}\|\phantom{-R-}\|$$
$$\phantom{-NH]_x-}O\phantom{-R-}O$$

wherein:
PO represents a polyoxypropylene group,
R is a divalent hydrocarbon group consisting of about 4 to about 34 carbon atoms, resulting from the reaction of an aliphatic or an aromatic dicarboxylic acid with a polyoxypropylene diamine,
a is a positive number having a value of 3 to about 11,
b is a positive number having a value of about 25 to 100, and
x is a positive number having a value of 1 to 5.

2. A polyamide as in claim 1 wherein R represents a divalent 6 carbon atom aromatic group resulting from the reaction of isophthalic acid with a polyoxypropylene diamine.

3. A polyamide as in claim 2 wherein "a" has a value between 5 and 6 and "b" has a value of about 33.

4. A polyamide as in claim 1 wherein R represents a divalent 4 to 34 carbon atom aliphatic hydrocarbon group resulting from the reaction of the corresponding aliphatic dicarboxylic acid with a polyoxypropylene diamine.

5. A polyamide as in claim 4 wherein the aliphatic dicarboxylic acid is adipic acid, "a" has a value between 5 and 6 and "b" has a value of about 33.

6. A polyamide as in claim 4 wherein the aliphatic dicarboxylic acid is dodecanedioc acid, "a" has a value between 5 and 6 and "b" has a value of about 33.

7. A polyamide as in claim 4 wherein the aliphatic dicarboxylic acid is a dimer fatty acid containing 36 carbon atoms, "a" has a value between 5 and 6 and "b" has a value of about 33.

* * * * *